United States Patent
Morris et al.

(10) Patent No.: US 7,289,806 B2
(45) Date of Patent: Oct. 30, 2007

(54) METHOD AND APPARATUS FOR CONTEXT ENABLED SEARCH

(75) Inventors: Tonia G. Morris, Chandler, AZ (US); Nikhil M. Deshpande, Beaverton, OR (US); Uttam K. Sengupta, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 490 days.

(21) Appl. No.: 10/812,679

(22) Filed: Mar. 30, 2004

(65) Prior Publication Data
US 2005/0223030 A1    Oct. 6, 2005

(51) Int. Cl.
*H04Q 7/20* (2006.01)

(52) U.S. Cl. ............. 455/432.3; 455/434; 455/550.1; 707/3

(58) Field of Classification Search ............ 455/414.1, 455/403, 432.3, 434, 407, 404.1, 456.1, 550.1, 455/412.2, 414.2; 707/1, 3, 2, 5, 100, 10, 707/102, 7, 104.1; 715/700, 764, 781, 784
See application file for complete search history.

(56) References Cited

U.S. PATENT DOCUMENTS

| | | | |
|---|---|---|---|
| 5,959,577 A * | 9/1999 | Fan et al. .............. | 342/357.13 |
| 6,812,959 B1 * | 11/2004 | Gfeller et al. .......... | 348/219.1 |
| 2002/0142737 A1 * | 10/2002 | Amano et al. ............... | 455/90 |
| 2002/0171673 A1 * | 11/2002 | Brown et al. ............... | 345/700 |
| 2003/0169923 A1 * | 9/2003 | Butterworth ............... | 382/181 |
| 2005/0162523 A1 * | 7/2005 | Darrell et al. .......... | 348/211.2 |
| 2005/0227676 A1 * | 10/2005 | De Vries ................. | 455/414.1 |
| 2006/0133321 A1 * | 6/2006 | Lim et al. .................. | 370/331 |
| 2006/0143176 A1 * | 6/2006 | Mojsilovic et al. ........... | 707/6 |

\* cited by examiner

*Primary Examiner*—Jean Gelin
(74) *Attorney, Agent, or Firm*—The Law Offices of John C. Scott; John C. Scott (57) ABSTRACT

Techniques and structures are disclosed for allowing context-based searches to be performed from a wireless device. In at least one embodiment, a wireless device may append context-specific information, collected by at least one local sensor to a network search query to be delivered to a remote search engine when a network search is being performed. The wireless device may then receive search results from the remote search engine in response to the network search query that identify the elements of appended context-specific information that were used to perform the network search. The wireless device may then display these search results to a user.

28 Claims, 5 Drawing Sheets

METHOD AND APPARATUS FOR CONTEXT ENABLED SEARCH

TECHNICAL FIELD

The invention relates generally to wireless communications and, more particularly, to techniques and structures for performing searches from wireless devices.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
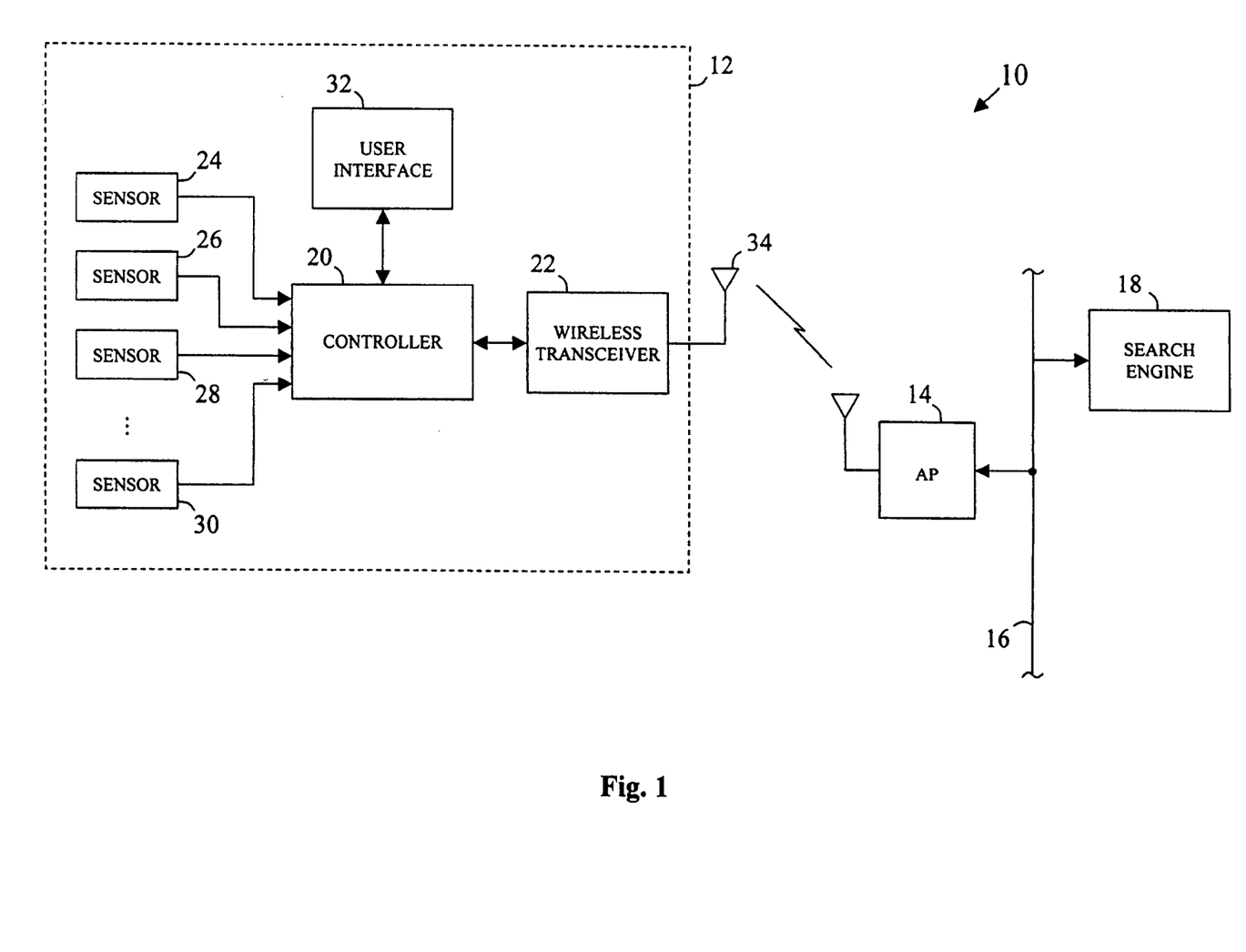
FIG. 1 is a block diagram illustrating an example wireless arrangement in accordance with an embodiment of the present invention.

FIG. 1 is a block diagram illustrating an example wireless arrangement 10 in accordance with an embodiment of the present invention. A wireless device 12 communicates, via wireless link, with a remote wireless access point (AP) 14 to gain access to a network. At least one search engine 18 is accessible through the network for use in performing information searches. A search query may be developed within the wireless device 12 and delivered to the search engine 18. The search engine 18 may then perform an information search based on the search query and deliver search results back to the wireless device 12. The wireless device 12 may include any form of mobile or portable wireless device or structure that is capable of communicating with a remote network or system including, for example, a cellular telephone or other handheld wireless communicator, a laptop, palmtop, or tablet computer having wireless networking capability, a personal digital assistant (PDA) having wireless networking capability, a camera having wireless networking capability, a pager, and/or others. In a cellular communication system, the AP 14 may be a cellular base station or the like.

The network may include any type of network that a wireless user may desire to access including, for example, a private network, a public network, a wireless network, a wired network, a local area network (LAN), a municipal area network (MAN), a wide area network (WAN), a public switched telephone network (PSTN), the Internet, and/or others, including combinations of the above. In the illustrated embodiment, the AP 14 is coupled to a network medium 16 that enables communication between nodes in the network. Any type of network medium (e.g., wired or wireless), or a combination of different types of network media, may be used. The search engine 18 may include, for example, an Internet search engine (e.g., Google™, Yahoo®, etc.), a search engine within a private network, and/or any other type of information search service.

With reference to FIG. 1, the wireless device 12 may include one or more of the following: a controller 20, a wireless transceiver 22, one or more context sensors 24, 26, 28, 30, and a user interface 32. The controller 20 is operative for controlling the overall operation of the wireless device 12. The controller functionality may be implemented within, for example, one or more digital processing devices. The wireless transceiver 22 is operative for supporting wireless communication with one or more remote wireless entities. In at least one embodiment, the wireless transceiver 22 may be configured in accordance with one or more wireless standards including, for example, one or more wireless cellular standards and/or one or more wireless networking standards. The wireless transceiver 22 may be coupled to one or more antennas 34 to facilitate the transmission and reception of wireless signals. Any type of antenna(s) may be used including, for example, a dipole antenna, a patch antenna, a helical antenna, an antenna array, and/or others. Other types of transducers may alternatively be used (e.g., an infrared (IR) diode in an IR based system, etc.).

The user interface 32 is operative for providing an interface between a user and the device 12. The user interface 32 may include structures such as, for example, a keyboard, a keypad, a display (e.g., a liquid crystal display, etc.), a speaker, a microphone, a mouse, a stylus, and/or any other form of device or structure that allows a user to input information or commands to the device 12 or receive information or responses from the device 12. As will be appreciated, the specific types of input/output devices that are used will depend upon the type of wireless device at issue.

The context sensors 24, 26, 28, 30 are sensors that are capable of sensing information about a present context or setting of the wireless device 12 (i.e., context-specific information). As used herein, the term "context-specific information" refers to any information that is descriptive of an environment about or within a wireless device. Such information may include, for example, a physical location of the wireless device, a present time at the wireless device, a temperature about the wireless device, a velocity of the wireless device, atmospheric pressure about the wireless device, biometric information regarding a user of the wireless device, ambient light about the wireless device, an ambient noise level and/or sound profile about the wireless device, an image of an environment about the wireless device, a chemical analysis of an environment about the wireless device, a personal profile of a user of the wireless device, information relating to a schedule of a user of the wireless device, information relating to a calendar of a user of the wireless device, and/or other information. The context sensors 24, 26, 28, 30 may be hardware sensors (e.g., a thermometer to sense ambient temperature, etc.) and/or software sensors (e.g., a sensor to sense calendar information, scheduling information, etc.). In addition, one or more elements within the user interface 32 may be used as a context sensor (e.g., a microphone to sense ambient noise, etc.). Some types of context sensors that may be used include, for example: a clock, a thermometer, a speed sensor, a Global Positioning System (GPS) receiver for position and/or time information, a barometer, a light sensor, a camera, a microphone, a fingerprint sensor, a hand geometry sensor, a skin temperature sensor, a skin texture sensor, a heartbeat sensor, a retinal scanner, chemical sensors, and/or others. Furthermore, some types of context-specific information may not have a corresponding sensor associated with them.

In at least one embodiment of the invention, the controller 20 is programmed to automatically append context-specific information to a search query to be delivered to a remote search engine 18. That is, the controller 20 may collect context-specific information from, for example, one or more context sensors 24, 26, 28, 30 and then attach this information to the query being sent to the search engine. In at least one embodiment, the controller 20 may first determine a type of search being performed by a user and then select the individual sensors or the individual types of context-specific information to include with the search query. In other embodiments, the controller 20 may send all available context-specific information with each search. Before appending information to a search query, the controller 20 may first check whether any of the available context sensors are not working properly (although such an action is not required). If so, the controller 20 can decide not to append the corresponding readings to the search query.

The controller 20 does not necessarily have to collect the context-specific information to be included with the search query after the search has been initiated. That is, some or all of the information may be collected before the search is initiated and stored in a predetermined location for easy retrieval during a search. For example, the controller 20 may periodically collect readings from some or all of the context sensors and store the readings in corresponding memory locations. Then, after a search has been initiated by a user, the information may be quickly retrieved from the corresponding locations. If such an approach is used for some or all of the sensor information, however, the information update interval should be small enough to ensure that the stored information is not stale by the time it is appended to the search query. Some types of information may be so time dependent that they have to be collected at the time of the search (e.g., velocity, time, etc.).

After the search query having the appended context-specific information has been received by the search engine 18, the search engine 18 may use the information to perform the search (e.g., generate a final search query that includes some or all of the context-specific information) and/or to narrow the search results (e.g., limit the results of a search to only those items that relate to a particular region, based on wireless device location information). In at least one implementation, the search engine 18 will determine how the context-specific information is to be used in each particular case. The search engine 18 may also be permitted to ignore some or all of the context-specific information.

After a search has been performed, the search engine 18 may deliver the search results back to the wireless device 12. The search engine 18 may also include with the search results a list of the types of context-specific information that were used in performing the search. When the search results are received by the wireless device 12, the controller 20 may cause the results to be displayed to the user. The controller 20 may also display the types of context-specific information that were used in performing the search to the user. In at least one embodiment of the invention, the controller 20 may then allow the user to select which type or types of context-specific information (or no context-specific information) that they want to have used in the search. The controller 20 may then send this selection information back to the search engine 18 to perform another search based thereon. In an alternative embodiment, the controller 20 may ask the user to identify types of context-specific information to append to the search query before the original search query is sent to the search engine 18.

Figure 2:
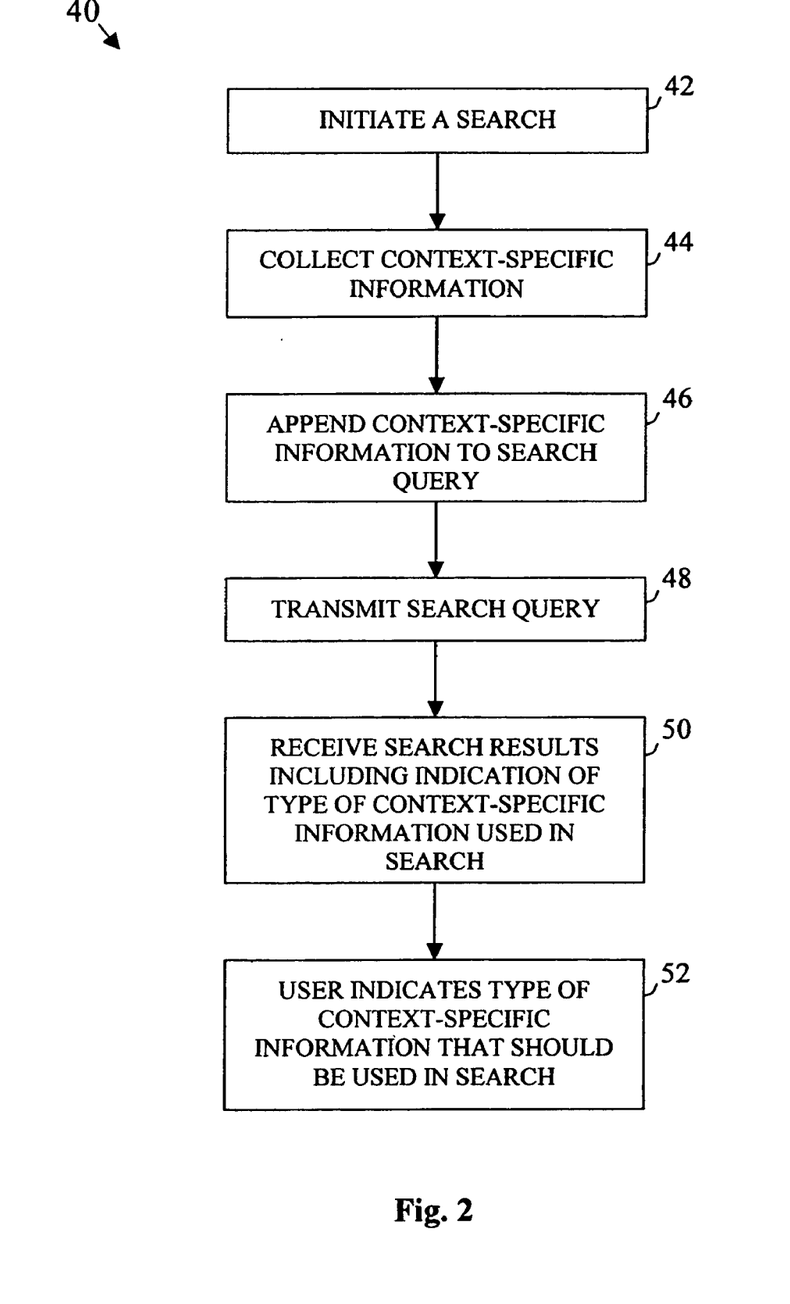
FIG. 2 is a flowchart illustrating an example method for use in performing a search from a wireless device in accordance with an embodiment of the present invention.

FIG. 2 is a flowchart illustrating an example method 40 for use in performing a search from a wireless device in accordance with an embodiment of the present invention. As shown, a search is initiated by a user of the wireless device (block 42). The search may be initiated in any of a variety of different ways. For example, a user may go to a particular web page (e.g., a search engine web page), a user may click within a search term entry box on a search engine toolbar, a user may open a particular application, etc. Context-specific information is collected within the wireless device (block 44). The context-specific information may be collected from one or more context sensors within the wireless device. In at least one embodiment, the user associated with the wireless device is permitted to specify the types of context-specific information to include with the search query (either at the time of the search or as predefined preferences). In other embodiments, context-specific information is automatically selected for inclusion based on, for example, search type. In still other embodiments, all available context-specific information is selected for inclusion with the search query.

The context-specific information is subsequently appended to the search query (block 46). The search query is then transmitted from the wireless device and ultimately reaches the search engine (block 48). The search engine performs the search making use of some or all (or none) of the context-specific information. The search engine then delivers the search results back to the wireless device along with an indication of the particular types of context-specific information that were used in performing the search (block 50). The wireless device presents the search results to the user along with the types of context-specific information identified by the search engine as having been used. The wireless device then allows the user to indicate the types of context-specific information that the user desires to be used in the search (block 52). The wireless device may then communicate the types of context-specific information indicated by the user to the search engine and another search may be performed based thereon.

A user of a wireless device may often be in a situation where the user sees text-based information in a surrounding environment that the user wishes to know more about. In response, the user can type the information of interest into the wireless device to develop a search query for delivery to a remote, network-based search engine to retrieve related information. However, the input keys on many wireless devices are often difficult and time consuming to use and may discourage a user from performing the search. In one aspect of the present invention, techniques and structures are provided for simplifying the process of generating a search expression based on text within a surrounding environment.

Figure 3:
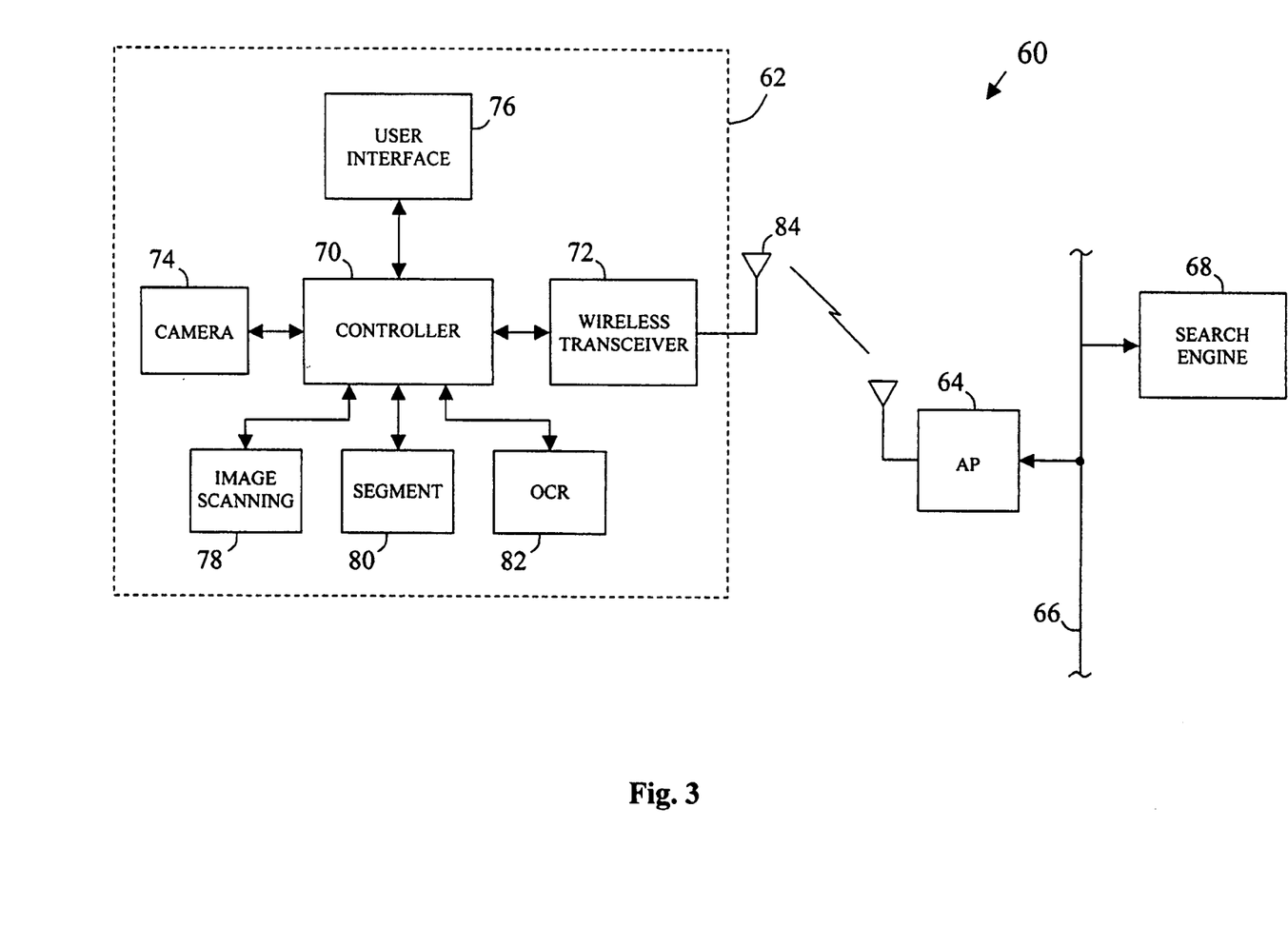
FIG. 3 is a block diagram illustrating an example wireless arrangement in accordance with another embodiment of the present invention.

FIG. 3 is a block diagram illustrating an example wireless arrangement 60 in accordance with an embodiment of the present invention. The wireless device 62 communicates, via wireless link, with a remote wireless access point (AP) 64 to gain access to a network. At least one search engine 68 is accessible through the network (via, for example, network medium 66) for use in performing information searches. As illustrated in FIG. 3, the wireless device 62 may include one or more of: a controller 70, a wireless transceiver 72, a camera 74, a user interface 76, an image scanning (or image stitching) unit 78, a segmentation unit 80, and an optical character recognition (OCD) unit 82. The controller 70 is operative for controlling the overall operation of the wireless device 62. The wireless transceiver 72, the antenna 84, and the user interface 76 are similar to the corresponding elements described previously. The camera 74 is an optical device that is capable of capturing images of an environment about the wireless device 62. The controller 70 may process one or more images output by the camera 74 to identify text within the image(s). In at least one embodiment, the controller 70 uses the image scanning (or image stitching) unit 78, the segmentation unit 80, and/or the OCR unit 82 to identify the text within the image(s). Once the text has been identified, the controller 70 may cause the text to be displayed to a user of the device 62. The user may then be permitted to select one or more words or phrases from the displayed text for use in an information search. The controller 70 may then generate a search query based on the selected text and cause the search query to be delivered to the search engine 68. The results of the search may then be delivered back to the wireless device 62 and displayed to the user.

The camera 74 may include any form of device or component that is capable of capturing images of a surrounding environment in an electronic form. In at least one implementation, the camera 74 is a relatively inexpensive, low resolution device that is an integral part of the wireless device. For example, some cellular telephones now include low resolution cameras within the body of the phone itself. The image scanning unit 78 is capable of generating a single higher resolution image from a number of lower resolution images captured by the camera 74. A higher resolution image may be necessary in order to accurately recognize text within the captured image(s). In at least one embodiment, the image scanning unit 78 is implemented within a digital processing device executing image scanning software. In an alternative approach, image "stitching" may be used to reconstruct higher resolution images from multiple lower resolution images. When image scanning techniques are used, a camera is placed in a know location with respect to an object of interest and the camera is then moved in a predetermined direction at a predetermined speed in order to capture the entire image. When image stitching techniques are used, a series of images are taken whereby the camera location can move with 3-dimensional freedom relative to the object of interest and the stitching software then resolves how the final images are placed together in order to create the final image. If a camera having adequate resolution is available, then image scanning or image stitching functionality may not be needed.

The segmentation unit 80 is operative for separating out or "segmenting" individual words from all other objects within the image or images generated by the camera 74. In one possible approach, the segmentation unit 80 may be implemented within a digital processing device executing image segmentation software. The OCR unit 82 is operative for converting images of text to actual machine recognizable text characters (e.g., ASCII characters, etc.). The OCR unit 82 may operate, for example, on the segmented words generated by the segmentation unit 80. In one possible approach, the OCR unit 82 may be implemented within a digital processing device executing OCR software. In at least one embodiment, the image scanning (or image stitching) unit 78, the segmentation unit 80, and the OCR unit 82 are each implemented in software within the same digital processing device as the controller functionality. Other techniques may alternatively be used. It should be appreciated that the image scanning unit 78, the segmentation unit 80, and the OCR unit 82 are not required in every implementation. That is, embodiments exist that do not include one or more of these elements.

After text has been identified within the captured image(s) by the controller 70, the controller 70 may display this text to a user of the device 62 (e.g., on an LCD display, etc.). The user may then be given an opportunity to select one or more of the words to be included within an information search. In one possible approach, the controller 70 causes a menu of identified words and/or phrases to be displayed to the user. The user can then scroll through the menu and select one (or more) of the words and/or phrases. In another possible approach, the controller 70 may display an image of the surrounding environment to the user with the individual words or phases highlighted. The user can then select desired words or phrases from the image (e.g., using a mouse, a stylus, or some other input device). Once one or more words or phrases have been selected, the controller 70 may generate a search query using the selected text. The controller 70 may also display a list of possible types of search that may be performed for the user (e.g., a Google™ search, a Yahoo® search, a search of a private database, etc.). The user may then select the type of search to be performed and the controller 70 will generate the appropriate search query.

Figure 4:
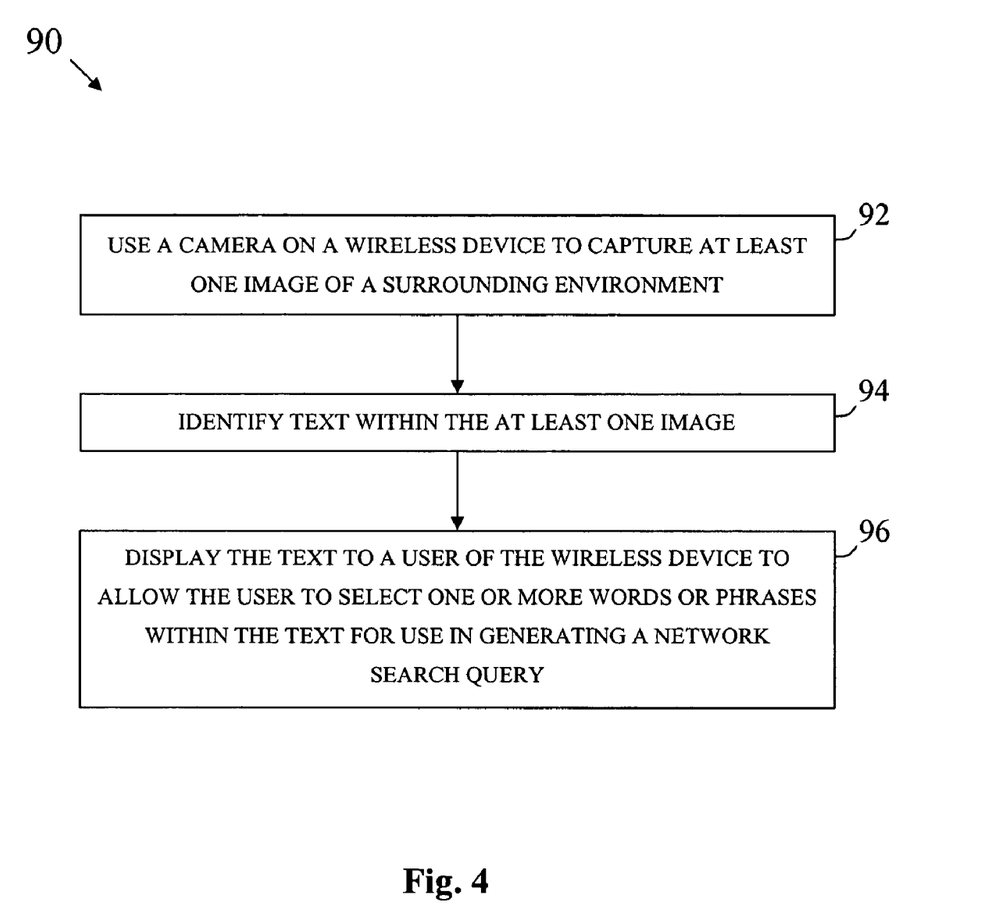
FIG. 4 is a flowchart illustrating an example method for use in developing a search query within a wireless device in accordance with an embodiment of the present invention.

FIG. 4 is a flowchart illustrating an example method 90 for use in developing a search query within a wireless device in accordance with an embodiment of the present invention. First, a camera associated with the wireless device is used to capture at least one image of a surrounding environment (block 92). For example, a user associated with the device may point the camera toward an object of interest and press a shutter control. Alternatively, the user may sweep the camera across a field of view to generate a plurality of temporally sequenced images. Other techniques are also possible. Text is next identified within the captured image (block 94). If a low resolution camera is being used, then image scanning software or image stitching software may be used to generate a higher resolution image from a number of lower resolution images. Segmentation and/or optical character recognition (OCR) may also be used to generate machine recognizable words from the text image. The text is then displayed to the user of the wireless device to allow the user to select one or more words or phrases for use in generating a search query for delivery to a remote search engine (block 96).

Figure 5:
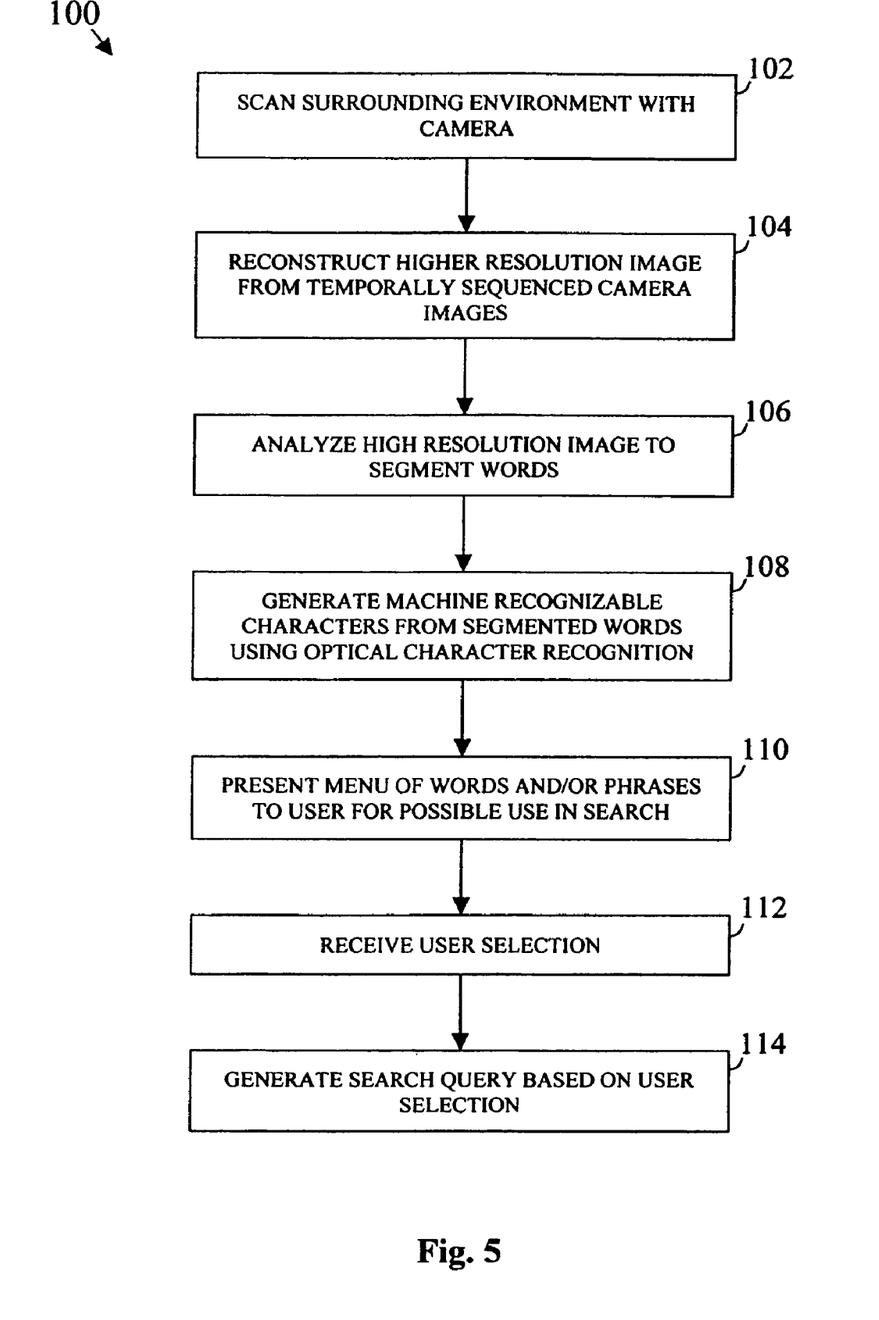
FIG. 5 is a flowchart illustrating another example method for use in developing a search query within a wireless device in accordance with an embodiment of the present invention.

FIG. 5 is a flowchart illustrating another example method 100 for use in developing a search query within a wireless device in accordance with an embodiment of the present invention. An environment about a wireless device is first scanned with a camera to capture a series of temporally sequenced images (block 102). A higher resolution image is then reconstructed from the temporally sequenced images (block 104). Image scanning software or image stitching software may be used to generate the higher resolution image. The higher resolution image is then analyzed to segment text within the image into individual words (block 106). Machine recognizable characters (e.g., ASCII characters) are then generated from the segmented words using optical character recognition techniques (block 108). A menu of words and/or phrases is then presented to a user of the device for possible use within a search (block 110). The user may then select one or more words and/or phrases for use within a search query (block 112). A search query may then be generated based on the user selections for delivery to a network-based search engine (block 114). A menu of possible search types may also be presented to the user for use in selecting a type of search to perform.

The techniques and structures of the present invention may be implemented in any of a variety of different forms. For example, features of the invention may be embodied within cellular telephones and other mobile communicators, pagers, portable computers, PDAs, network interface cards (NICs) and other network interface structures, integrated circuits, wireless access points, network servers, as instructions and/or data structures stored on machine readable media, and/or in other formats. Examples of different types of machine readable media that may be used include floppy diskettes, hard disks, optical disks, CD-ROMs, magneto-optical disks, ROMs, RAMs, EPROMs, EEPROMs, magnet or optical cards, flash memory, and/or other types of media suitable for storing electronic instructions. Features of the invention may be made part of, for example, a web browser program or other application that may be loaded into a wireless device. Features of the invention may also be made part of the operating system of the wireless device. In at least one embodiment of the present invention, camera-based text searching and context-specific data searching are both practiced within a common device. In at least one implementation, the invention is embodied as a set of instructions that are modulated onto a carrier wave for transmission over a transmission medium. As will be appreciated, many alternative implementations are also possible.

It should be appreciated that the individual blocks illustrated in the block diagrams herein may be functional in nature and do not necessarily correspond to discrete hardware elements. For example, in at least one embodiment, two or more of the blocks in a diagram are implemented in software within a single (or multiple) digital processing device(s). The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A wireless device comprising:
   a user interface;
   a controller to control operation of said wireless device, said controller being in communication with said user interface to accept input from a user and to deliver output to said user; and
   a wireless transceiver to support wireless communication with at least one remote wireless entity;
   wherein said controller is programmed to: (a) append context-specific information collected by at least one local sensor to a network search query to be delivered to a remote search engine via said wireless transceiver when said user is performing a network search, (b) receive search results from said remote search engine, via said wireless transceiver, in response to said network search query, said search results including an indication of which elements of context-specific information that were appended to said network search query were used to perform the network search, and (c) display said search results to a user.

2. The wireless device of claim 1, further comprising:
   at least one sensor for sensing context-specific information in an environment about said wireless device.

3. The wireless device of claim 1, wherein:
   said context-specific information includes at least one of the following: a physical location of said wireless device, a present time at said wireless device, a temperature about said wireless device, a velocity of said wireless device, atmospheric pressure about said wireless device, biometric information regarding a user of said wireless device, ambient light about said wireless device, ambient noise level about said wireless device, a sound profile about said wireless device, an image of an environment about said wireless device, a chemical analysis of an environment about said wireless device, a personal profile of a user of said wireless device, schedule information associated with a user of said wireless device, and calendar information associated with a user of said wireless device.

4. The wireless device of claim 1, wherein:
   said user interface includes at least one of the following: a display, a keypad, a keyboard, a touch screen, a stylus, a mouse, scroll buttons, a track ball, a joystick, and control buttons.

5. The wireless device of claim 1, wherein:
   said controller is programmed to: (a) receive a selection of context-specific information types from said user, via said user interface, indicating which context-specific information said user desires to be used to perform a network search, and (b) deliver said selection of context-specific information types to said remote search engine, via said wireless transceiver, for use in another network search.

6. The wireless device of claim 1, wherein:
   said wireless device is a cellular telephone.

7. The wireless device of claim 1, wherein:
   said wireless device is a personal digital assistant with wireless networking capability.

8. The wireless device of claim 1, wherein:
   said wireless device is a portable computer with wireless networking capability.

9. The wireless device of claim 1, wherein:
   said network search includes an Internet search.

10. A method comprising:
    detecting initiation of a network search within a wireless device;
    collecting context-specific information regarding said wireless device;
    appending context-specific information to a search query to be delivered to a remote search engine;
    transmitting said search query to said remote search engine using a wireless transceiver within said wireless device; and
    receiving search results from said remote search engine, via said wireless transceiver, in response to said search query, said search results including an indication of context-specific information elements that were used to perform said network search.

11. The method of claim 10, wherein:
    collecting context-specific information regarding said wireless device includes collecting at least one of the following: a physical location of said wireless device, a present time at said wireless device, a temperature about said wireless device, a velocity of said wireless device, atmospheric pressure about said wireless device, biometric information regarding a user of said wireless device, ambient light about said wireless device, ambient noise level about said wireless device, a personal profile of a user of said wireless device, schedule information associated with a user of said wireless device, and calendar information associated with a user of said wireless device.

12. The method of claim 10, wherein:
    collecting context-specific information regarding said wireless device includes polling at least one sensor associated with said wireless device for context-specific information.

13. The method of claim 10, wherein:
    collecting context-specific information regarding said wireless device includes determining which of a plurality of available sensors are presently working properly and polling only said sensors that are presently working properly for context-specific information.

14. The method of claim 10, wherein:
    collecting context-specific information regarding said wireless device is performed before detecting initiation of a network search.

15. The method of claim 10, wherein:
    collecting context-specific information regarding said wireless device is performed after detecting initiation of a network search.

16. The method of claim 10, wherein:
    collecting context-specific information regarding said wireless device is performed both before and after detecting initiation of a network search.

17. The method of claim 10, further comprising:
    obtaining a selection of context-specific information types from said user that said user would like to be included within a repeat network search; and
    transmitting said selection of context-specific information elements to said remote search engine, using said wireless transceiver, for use in performing another network search.

18. The method of claim 10, wherein:
    collecting context-specific information includes determining which context-specific information to collect based on a type of network search that has been initiated.

19. The method of claim 10, wherein:
    collecting context-specific information includes:
        using a camera on a wireless device to capture at least one image of a surrounding environment;
        identifying text within said at least one image; and
        allowing said user to select one or more words or phrases within said identified text for use in a search query.

20. The method of claim 19, wherein:
    appending context-specific information includes appending said user selected words or phrases to said search query.

21. A wireless device comprising:
    at least one dipole antenna;
    a user interface;
    a controller to control operation of said wireless device, said controller being in communication with said user interface to accept input from a user and to deliver output to said user; and
    a wireless transceiver, coupled to said at last one dipole antenna, to support wireless communication with at least one remote wireless entity;
    wherein said controller is programmed to: (a) automatically append context-specific information collected by at least one local sensor to a network search query to be delivered to a remote search engine via said wireless transceiver when said user is performing a network search, (b) receive search results from said remote search engine, via said wireless transceiver, in response to said network search query, said search results including an indication of which elements of context-specific information that were appended to said network search query were used to perform the network search, and (c) display said search results to a user.

22. The wireless device of claim 21, further comprising:
    at least one sensor for sensing context-specific information in an environment about said wireless device.

23. The wireless device of claim 21, wherein:
    said user interface includes at least one of the following: a display, a keypad, a keyboard, a touch screen, a stylus, a mouse, scroll buttons, a track ball, a joystick, and control buttons.

24. A computer readable storage medium having instructions stored thereon that, when executed by a computing platform, operate to:
    detect initiation of a network search within a wireless device;
    collect context-specific information regarding said wireless device; and
    append context-specific information to a search query to be delivered to a remote search engine;
    transmit said search query to said remote search engine; and
    receive search results from said remote search engine in response to said search query, said search results including an indication of context-specific information types that were used to perform said network search.

25. The computer readable storage medium of claim 24, wherein to:
    collect context-specific information regarding said wireless device includes to poll at least one sensor associated with said wireless device for context-specific information.

26. The computer readable storage medium of claim 24, wherein said storage medium further includes instructions that, when executed by the computing platform, operate to:

obtain a selection of context-specific information types from said user that said user would like to be included within a repeat network search; and transmit said selection of context-specific information types to said remote search engine for use in performing another network search.

27. The computer readable storage medium of claim 24, wherein operation to collect context-specific information regarding said wireless device includes operation to determine which of a plurality of available sensors are presently working properly and operation to poll only said sensors that are presently working properly for context-specific information.

28. The computer readable storage medium of claim 24, wherein operation to collect context-specific information includes operation to determine which context-specific information to collect based on a type of network search that has been initiated.

* * * * *